(12) United States Patent
Herting et al.

(10) Patent No.: US 8,098,197 B1
(45) Date of Patent: Jan. 17, 2012

(54) SYSTEM AND METHOD FOR PROVIDING HYBRID GLOBAL POSITIONING SYSTEM/HEIGHT OF BURST ANTENNA OPERATION WITH OPTIMIZIED RADIATION PATTERNS

(75) Inventors: Brian J. Herting, Marion, IA (US); Lee M. Paulsen, Cedar Rapids, IA (US); James H. Doty, Cedar Rapids, IA (US); James B. West, Cedar Rapids, IA (US); Nathan P. Lower, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 259 days.

(21) Appl. No.: 12/549,913

(22) Filed: Aug. 28, 2009

(51) Int. Cl.
*H04B 7/10* (2006.01)
(52) U.S. Cl. .......................................... 342/365
(58) Field of Classification Search .................. 342/365
See application file for complete search history.

(56) References Cited

U.S. PATENT DOCUMENTS 7,570,219 B1 * 8/2009 Paulsen et al. ................ 343/708
2006/0087385 A1 * 4/2006 Fitzpatrick et al. ........... 333/117

* cited by examiner

*Primary Examiner* — Harry Liu
(74) *Attorney, Agent, or Firm* — Donna P. Suchy; Daniel M. Barbieri

(57) ABSTRACT

The present invention is a device which includes an antenna and circuitry. The antenna may receive a circularly-polarized signal as first and second linearly-polarized signals. The circuitry is connected to the antenna and is configured for combining the first and second linearly-polarized signals to produce at least two reception patterns. The reception patterns are created by summing the first and second linearly-polarized signals via phase shifting. The reception patterns are optimized for at least two substantially different directional orientations. Further, the antenna may simultaneously allow/provide spec-compliant Global Positioning System operation and spec compliant Height of Burst operation.

18 Claims, 6 Drawing Sheets

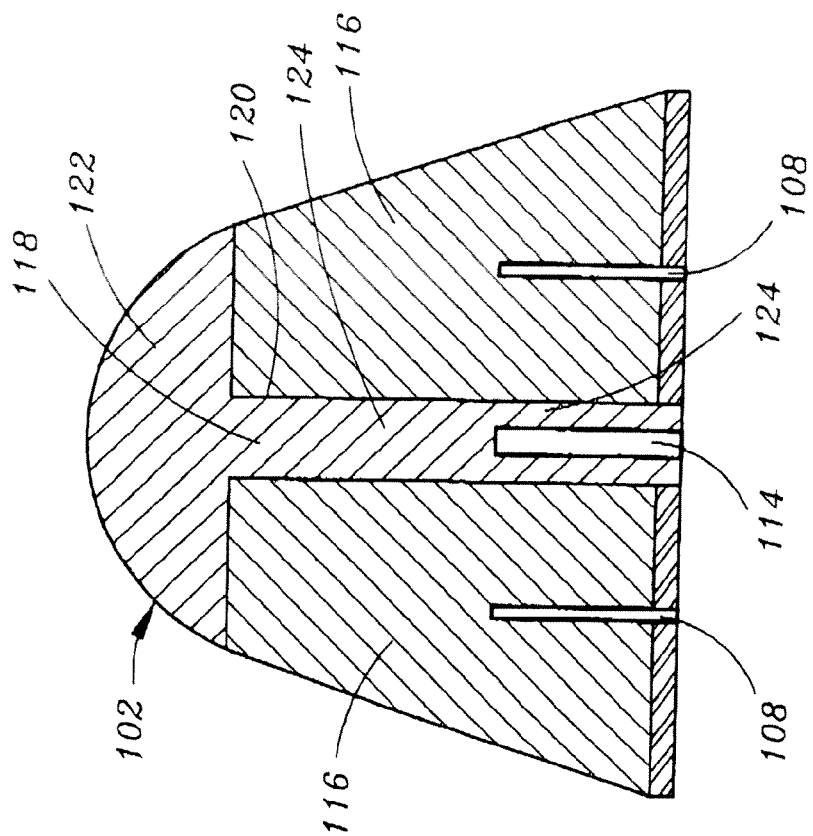
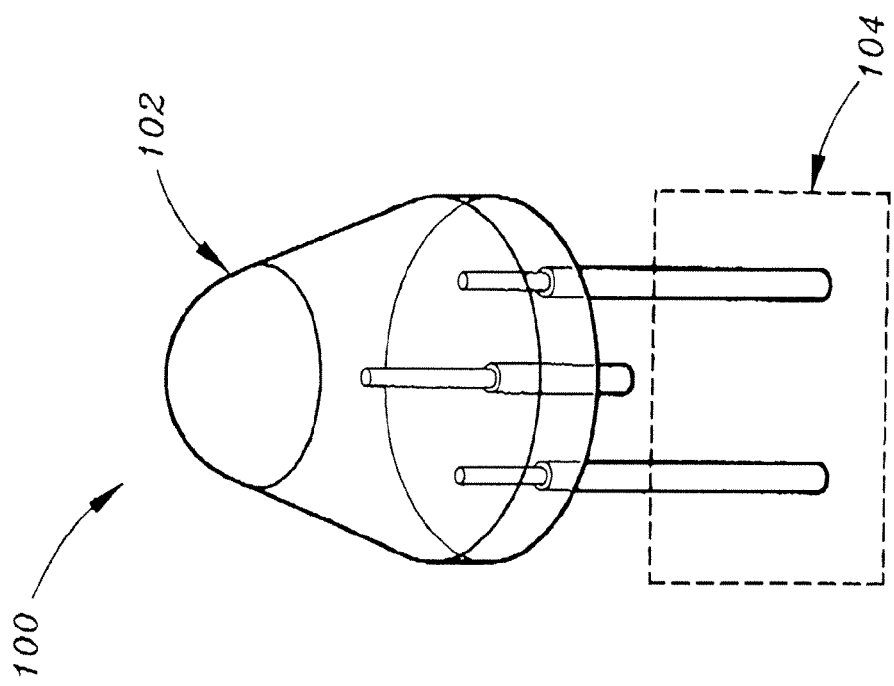

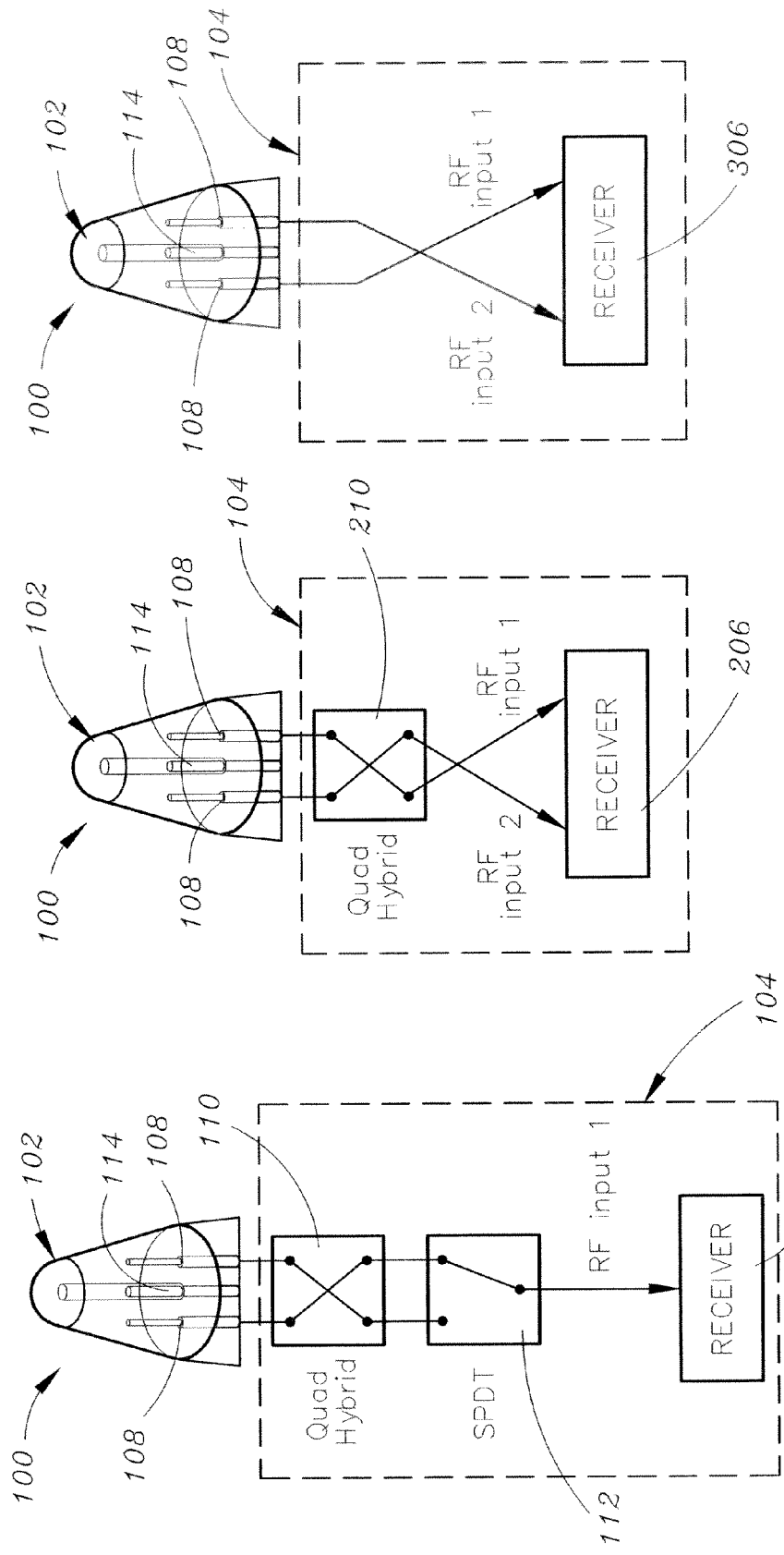

SYSTEM AND METHOD FOR PROVIDING HYBRID GLOBAL POSITIONING SYSTEM/HEIGHT OF BURST ANTENNA OPERATION WITH OPTIMIZIED RADIATION PATTERNS

FIELD OF THE INVENTION

The present invention relates to the field of Radio Frequency (RF) devices/advanced sensors and particularly to a system and method for providing hybrid Global Positioning System (GPS)/Height of Burst (HOB) antenna operation with optimized radiation patterns.

BACKGROUND OF THE INVENTION

A number of current RF devices may not provide a desired level of performance.

Thus, it would be desirable to provide a device which obviates the problems associated with current RF devices.

SUMMARY OF THE INVENTION

Accordingly, an embodiment of the present invention is directed to a device, including: an antenna, the antenna being configured for receiving a circularly-polarized signal as a first linearly-polarized signal and a second linearly-polarized signal; and circuitry, the circuitry being connected to the antenna, the circuitry being configured for combining the first linearly-polarized signal and the second linearly-polarized signal to produce at least two reception patterns, the reception patterns being created by summing the first linearly-polarized signal and the second linearly-polarized signal via utilization of phase shifting, such that the reception patterns are optimized for at least two substantially different directional orientations, wherein the antenna is further configured for allowing/providing both spec-compliant Global Positioning System operation and spec-compliant Height of Burst operation.

An additional embodiment of the present invention is directed to a method for signal handling via a device, the method including: receiving a circularly-polarized signal via an antenna of the device as a first linearly-polarized signal and a second linearly-polarized signal; providing the first linearly-polarized signal and the second linearly-polarized signal from the antenna of the device to a quadrature hybrid combiner circuit of the device; combining the first linearly-polarized signal and the second linearly-polarized signal via the quadrature hybrid combiner to produce at least two reception patterns, wherein the reception patterns are created by summing the first linearly-polarized signal and the second linearly-polarized signal via utilization of phase shifting, such that the reception patterns are optimized for at least two substantially different directional orientations; providing the at least two reception patterns from the quadrature hybrid combiner of the device to a receiver of the device; and correlating the reception patterns, via the receiver, with orbital information received by the receiver from at least one satellite of a satellite navigation system, wherein the receiver determines a location of the receiver based upon said correlating.

A further embodiment of the present invention is directed to a method for signal handling via a device, the method including: receiving a circularly-polarized signal via an antenna of the device as a first linearly-polarized signal and a second linearly-polarized signal; providing the first linearly-polarized signal and the second linearly-polarized signal from the antenna of the device to a quadrature hybrid combiner circuit of the device; combining the first linearly-polarized signal and the second linearly-polarized signal via the quadrature hybrid combiner to produce a reception pattern, wherein the reception pattern is created by summing the first linearly-polarized signal and the second linearly-polarized signal via utilization of phase shifting, such that the reception pattern is selectively optimized for one of two substantially different directional orientations; providing the reception pattern from the quadrature hybrid combiner of the device to a switch of the device; providing the reception pattern from the switch of the device to a receiver of the device; and correlating the reception pattern, via the receiver, with orbital information received by the receiver from at least one satellite of a satellite navigation system, wherein the receiver determines a location of the receiver based upon said correlating.

A still further embodiment of the present invention is directed to a method for signal handling via a device, the method including: receiving a circularly-polarized signal via an antenna of the device as a first linearly-polarized signal and a second linearly-polarized signal; providing the first linearly-polarized signal and the second linearly-polarized signal from the antenna of the device to a receiver of the device; combining the first linearly-polarized signal and the second linearly-polarized signal via the receiver to produce at least two reception patterns, wherein the reception patterns are created by summing the first linearly-polarized signal and the second linearly-polarized signal via utilization of phase shifting, such that the reception patterns are optimized for at least two substantially different directional orientations; correlating the reception patterns, via the receiver, with information received by the receiver from at least one satellite of a satellite navigation system; and determining a location of the receiver based upon said correlating.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIGS. 1A and 1B are views of a device for providing signal handling in accordance with an exemplary embodiment of the present invention;

FIG. 2A is a block diagram schematic illustrating a device for providing signal handling in accordance with an exemplary embodiment of the present invention;

FIG. 2B is a block diagram schematic illustrating a device for providing signal handling in accordance with an alternative exemplary embodiment of the present invention;

FIG. 2C is a block diagram schematic illustrating a device for providing signal handling in accordance with a further alternative exemplary embodiment of the present invention;

DETAILED DESCRIPTION OF THE INVENTION

Figure 3:
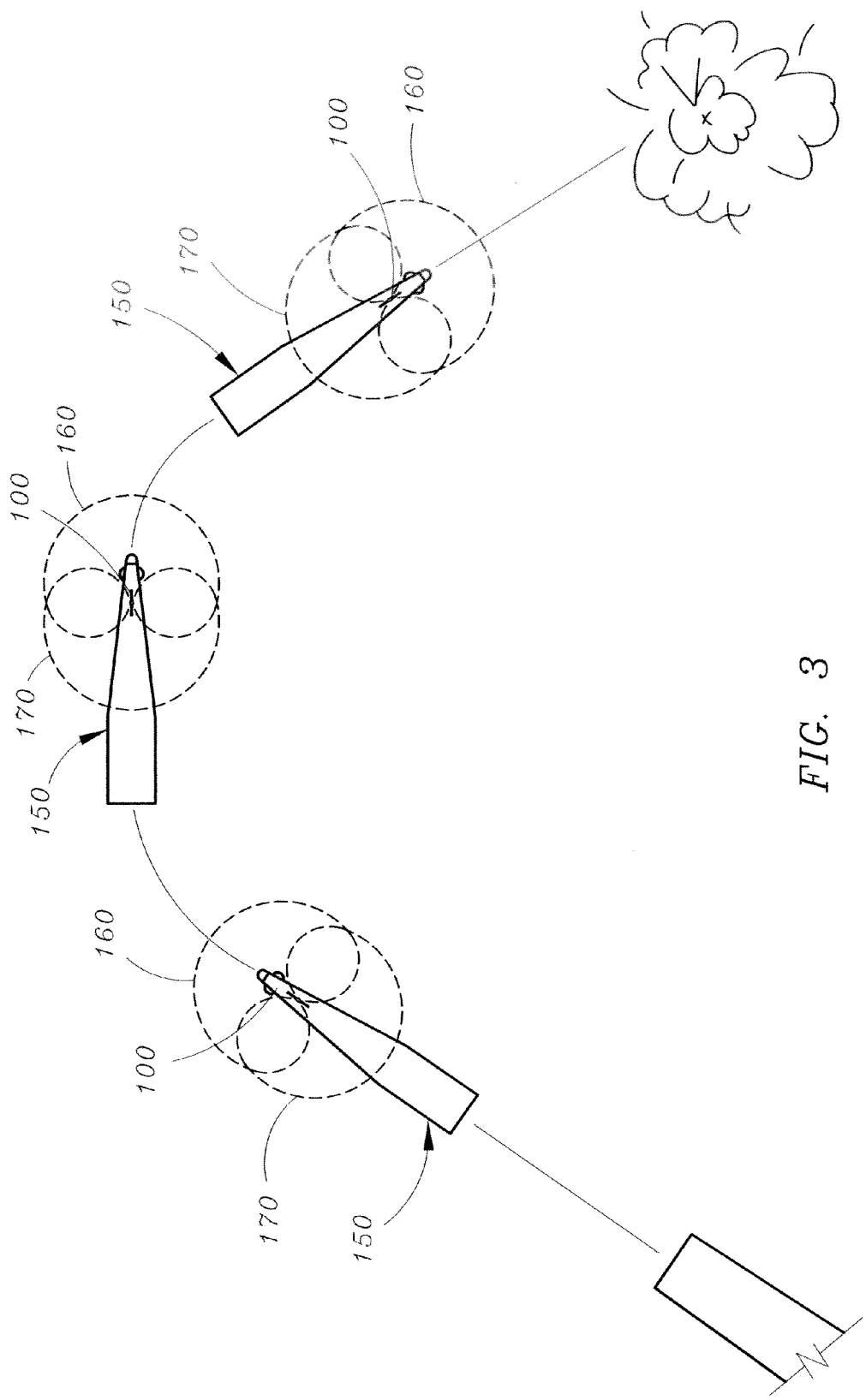
FIG. 3 is an illustration of radiation patterns provided when either the device embodiment shown in FIG. 2B or the device embodiment shown in FIG. 2C is implemented on a GPS-guided munition platform in accordance with an exemplary embodiment of the present invention.

Reference will now be made in detail to the presently preferred embodiments of the invention, examples of which are illustrated in the accompanying drawings.

Currently available Global Positioning System (GPS) antennas designed for artillery shell applications have fixed radiation patterns. Due to artillery shell flight geometries, a fixed radiation pattern may not provide optimal performance over the entire duration of the artillery shell's flight. For example, by having a fixed forward-looking pattern (ex.—forward-looking gain pattern), a GPS antenna of an artillery shell may provide excellent performance (ex.—excellent sky coverage) during the initial launch phase/ascent, which may promote improved Time-to-First-Nav (TTFN) performance. However, the fixed forward-looking pattern may result in poor performance (ex.—poor sky coverage) during the terminal descent phase, since the peak of the antenna beam would be pointed towards the target instead of the sky.

Further, a number of these currently available GPS antennas are also suitable for providing Height-of-Burst (HOB) operation. These combination GPS/HOB antennas are homogenous dielectric antennas, such as homogenous dielectric Dielectric Resonator Antennas (DRAs). However, the homogenous dielectric DRAs generally do not achieve the required bandwidth, since the high permittivity loading (ex.—dielectric constant=27) required for GPS operation (ex.—L1 GPS operation) directly limits the bandwidth of a higher-frequency HOB operating mode, thereby resulting in HOB operation which is unsatisfactory (ex.—not spec-compliant). For example, when a homogenous dielectric resonator implemented in one of these DRAs is designed to operate at L1 GPS (ex.—the resonator has a dielectric constant=27), necessary bandwidth from the HOB feed will not be permitted. Alternatively, when a homogenous dielectric resonator implemented in one of these DRAs has a sufficiently low dielectric for allowing HOB operation to function properly, it will not resonate the GPS feeds at L1.

Referring to FIGS. 1A and 1B, a device for providing signal handling in accordance with an exemplary embodiment of the present invention is shown. In the illustrated embodiment, the device 100 may include an antenna 102. In exemplary embodiments, the antenna 102 may be a satellite navigation system antenna (ex.—a Global Positioning System (GPS) antenna) configured for receiving signals from one or more satellites of a satellite navigation system. Further, the antenna 102 may be a Dielectric Resonator Antenna (DRA).

In exemplary embodiments of the present invention, the antenna 102 may be configured for receiving a circularly-polarized signal as a first linearly-polarized signal and a second linearly-polarized signal. For instance, the first and second linearly-polarized signals may be two orthogonal, linearly-polarized waves produced by the antenna based upon the circularly-polarized signal.

In further embodiments of the present invention, the device 100 may include circuitry 104. The circuitry 104 may be connected to the antenna 102. The circuitry 104 may be configured for combining (ex.—via quadrature combining) the first linearly-polarized signal and the second linearly-polarized signal to produce at least two reception patterns/radiation patterns.

In exemplary embodiments of the present invention, the circuitry 104 may produce the reception patterns by summing the first linearly-polarized signal and the second linearly-polarized signal via utilization of phase shifting, such that the reception patterns are optimized for at least two substantially different directional orientations. For example, the circuitry 104 may be configured for producing a forward-looking reception pattern and a backward-looking reception pattern.

Referring generally to FIGS. 2A, 2B and 2C, three alternative exemplary embodiments of the device 100 are shown. In the embodiment of the device 100 shown in FIG. 2C, the circuitry 104 includes a receiver 306 (ex.—a GPS receiver) which is connected to the antenna 102 (ex.—GPS antenna). Further, the receiver 306 is configured for receiving the first linearly-polarized signal (ex.—Radio Frequency (RF) input 1, as shown in FIG. 2C) and the second linearly-polarized signal (ex.—RF input 2, as shown in FIG. 2C) from the antenna 102 via linear polarized (LP) feed ports/feeds 108 (ex.—GPS feeds/L1 GPS feeds) of/connected to the antenna 102. For example, the first linearly-polarized signal and the second linearly-polarized signal may be simultaneously received by the receiver 306. Still further, the receiver 306 may then be configured for producing (ex.—digitally synthesizing) a forward-looking reception pattern and a backward-looking reception pattern based on the received first and second linearly-polarized signals. For instance, the receiver 306 may produce the reception patterns by summing the first linearly-polarized signal and the second linearly-polarized signal via utilization of phase shifting.

In the embodiment of the device 100 shown in FIG. 2B, the circuitry 104 may include a feed network/combiner circuit 210 (ex.—a quadrature hybrid combiner circuit/quadrature hybrid feed network) and a receiver 206 (ex.—a GPS receiver). As shown in FIG. 2B, the quadrature hybrid combiner circuit 210 may be connected between (and connected to each of) the antenna 102 and a receiver 206. For example, the quadrature hybrid combiner circuit 210 is configured for receiving the first linearly-polarized signal and the second linearly-polarized signal from the antenna 102 via linear polarized (LP) feed ports 108 (ex.—GPS feeds) of/connected to the antenna 102. Further, the quadrature hybrid combiner circuit 210 is configured for producing a forward-looking reception pattern and a backward-looking reception pattern based on the received first and second linearly-polarized signals. For instance, the quadrature hybrid combiner circuit 210 may produce the reception patterns by summing the first linearly-polarized signal and the second linearly-polarized signal via utilization of phase shifting. Further, the quadrature hybrid combiner circuit 210 is configured for providing the forward-looking reception pattern (ex.—a forward-looking, right-hand-circularly-polarized (RHCP) radiation pattern) and the backward-looking reception pattern (ex.—a backward-looking RHCP radiation pattern) to the receiver 206. For example, the reception patterns may be simultaneously received by the receiver 206.

In the embodiment of the device 100 shown in FIG. 2A, the circuitry 104 may include a feed network/combiner circuit 110 (ex.—a quadrature hybrid combiner circuit/quadrature hybrid feed network), a receiver 106 (ex.—a GPS receiver), and a switch 112 (ex.—a single pull double throw (SPDT)

switch). As shown in FIG. 2A, the switch 112 may be connected between (and connected to each of) the quadrature hybrid combiner circuit 110 and the receiver 106. Further, the quadrature hybrid combiner circuit 110 may be connected between (and connected to each of the antenna 102 and the switch 112. The quadrature hybrid combiner circuit 110 is configured for receiving the first linearly-polarized signal and the second linearly-polarized signal from the antenna 102 via linear polarized (LP) feed ports 108 (ex.—GPS feeds) of/connected to the antenna 102. Further, the quadrature hybrid combiner circuit 110 is configured for producing a forward-looking reception pattern and a backward-looking reception pattern based on the received first and second linearly-polarized signals. For instance, the quadrature hybrid combiner circuit 110 may produce the reception patterns by summing the first linearly-polarized signal and the second linearly-polarized signal via utilization of phase shifting. Further, the quadrature hybrid combiner circuit 210 is configured for providing the forward-looking reception pattern and the backward-looking reception pattern to the switch 112. Still further, the switch 112 is configured for selectively providing either the forward-looking reception pattern or the backward-looking reception pattern to the receiver 106 based on a setting/configuration of the switch 112.

In exemplary embodiments of the present invention, the device 100 may be implemented on a guided munition platform, such as with/on-board an artillery shell, mortar, or the like. As shown in FIG. 3, the device 100 may be implemented on-board a GPS-guided artillery shell 150 so that the device 100 (ex.—receiver 106, 206, or 306) may dynamically track the location of the device 100/receiver (106, 206, 306)/artillery shell 150 during the flight of the artillery shell 150. Because the device embodiments shown in FIGS. 2B and 2C allow for both a forward-looking reception pattern/RHCP beam 160 and a backward-looking reception pattern/RHCP beam 170 to be provided (ex.—simultaneously provided) to the receiver (206, 306), the device embodiments shown in FIGS. 2B and 2C may each provide a dual-beam device 100 which may promote the providing of optimal sky coverage during the entire flight of the shell 150 (ex.—during both the ascent phase and descent phase). Considering the multiple parallel data streams intrinsic to a number of currently available GPS receivers, one hundred-percent (100%) sky coverage may be attainable by the device embodiments shown in FIGS. 2B and 2C.

Further, as mentioned above, the device embodiment shown in FIG. 2A allows for selective providing of either a forward-looking reception pattern/beam or a backward-looking reception pattern/beam to the receiver 106. For example, the device 100 of FIG. 2A may dynamically select/establish/change the setting of the switch 112 during the flight of the artillery shell 150 so that the switch 112 may provide either the backward-looking reception pattern/beam or the forward-looking reception pattern/beam to the receiver 106. The reception pattern provided to the receiver 106 via the switch 112 may be selected based on the location of the device 100/artillery shell 150 along its flight path/trajectory to optimize sky coverage of the device 100. For instance, during the ascent portion of the flight path of the artillery shell 150, the forward-looking reception pattern/beam may be provided to the receiver 106, while during the descent portion of the flight path of the artillery shell 150, the backward-looking reception pattern/beam may be provided to the receiver 106. Because the device embodiment shown in FIG. 2A allows for selectively (and dynamically) providing either a forward-looking reception pattern/beam 160 or a backward-looking reception pattern/beam 170, the device embodiment shown in FIG. 2A may provide a switched-beam device 100 which may promote improved sky coverage over the entire flight of the shell 150 (ex.—during both the ascent phase and descent phase) compared to artillery shell applications which implement fixed reception patterns. In additional embodiments, the device 100 may implement either analog or digital beam forming and switching.

In each of the device embodiments illustrated in FIGS. 2A, 2B and 2C, the receiver (106, 206, 306) may be further configured for correlating the reception pattern(s) with information/data for one or more satellites of the satellite navigation system (ex.—GPS satellites). For example, the information/data may be provided via message signals which are provided by the satellites to the device 100, wherein said message signals may include message signal transmission time data, orbital information for the satellites, and the like. For example, based upon this correlating and location information of the satellites, the receiver (106, 206, 306) may determine a location of the receiver (106, 206, 306)/may determine its own location.

In further embodiments, the device 100 may also be suitable for Height-of-Burst (HOB) operation in addition to GPS operation. In exemplary embodiments of the present invention, the antenna 102 of the device 100 may include/may be connected to an HOB feed 114 for accommodating HOB operation. Thus, the antenna 102 may be a hybrid GPS/HOB antenna 102. As mentioned above, the antenna 102 may be a dielectric resonator antenna (DRA) 102. Further, the dielectric resonator antenna 102 may include a first portion 116 and a second portion 118. The first portion 116 may be formed of a material having a first dielectric constant. The first dielectric constant may be suitable for resonating a GPS feed 108 of the antenna 102. For example, the first portion may be formed of a material having a dielectric constant equal to twenty-seven (ex.—ceramic). The second portion 118 may be formed of a material having a second dielectric constant. The second dielectric constant may be suitable for permitting necessary bandwidth from the HOB feed 114 to allow for spec-compliant HOB functionality. For example, the second portion may be formed of a material having a dielectric constant equal to four.

As mentioned above, the device 100/antenna 102 of the exemplary embodiments of the present invention may be implemented on a munition platform (ex.—within/on-board an artillery shell 150). For example, the antenna 102 may be a nose-mounted, gun hard DRA 102 as shown in the illustrated embodiments. In the exemplary embodiments, the first portion 116 (ex.—the GPS dielectric) may be configured as a conical section (ex.—a ceramic conical section) with a hole/aperture/cavity 120 formed therein (ex.—formed in the center of the conical section 116). Further, the second portion 118 (ex.—the HOB dielectric) may be connected to (ex.—mounted on/potted at least partially within) the first portion 116 (ex.—in a concentric configuration) and may include a first section configured to form a tip 122 (ex.—an ogive tip) of the artillery shell 150 (as shown in FIG. 1B). Still further, the second portion 118 may include a second section configured as a tube 124. For instance, the second section 124 may be connected to (ex—may be integral with) the first section 122 of the second portion 118 of the DRA 102, may extend through the aperture 120/into the cavity (ex.—may at least substantially fill the cavity 120) of the first portion 116 of the DRA 102, and may at least partially enclose/cover the HOB feed 114, thereby protecting the HOB feed 114, said HOB feed 114 being nested at least substantially within the DRA 102. (as shown in FIG. 1B). Thus, the antenna 102 of the illustrated embodiments of the present invention may implement the above-described concentric stratified dielectric DRA 102 to allow for spec-compliant GPS and HOB operation from the same antenna 102 (ex.—simultaneous/concurrent spec-compliant GPS and HOB operation), which may promote reduced antenna count in/on space-constrained platforms.

In the exemplary embodiments we have utilized GPS as an example RF signal of interest. The invention disclosed herein may be applied to a wide range of satellite, airborne and terrestrial navigation signals such as the NAVSTAR Global Positioning System (GPS), the Global'naya Navigatsionnaya Sputnikovaya Sistema (GLONASS), Galileo positioning system, or the Compass navigation system. In addition, the invention disclosed herein may be applied to a wide range of circular or elliptically polarized communications signals. Further, the antenna and signal processing approach may be reciprocal in nature and the receiver may be replaced with a transmitter to produce an RF output with greater gain in a preferred direction. The invention disclosed herein may therefore be applied to a wide range of navigation, communications and telemetry applications.

Figure 4:
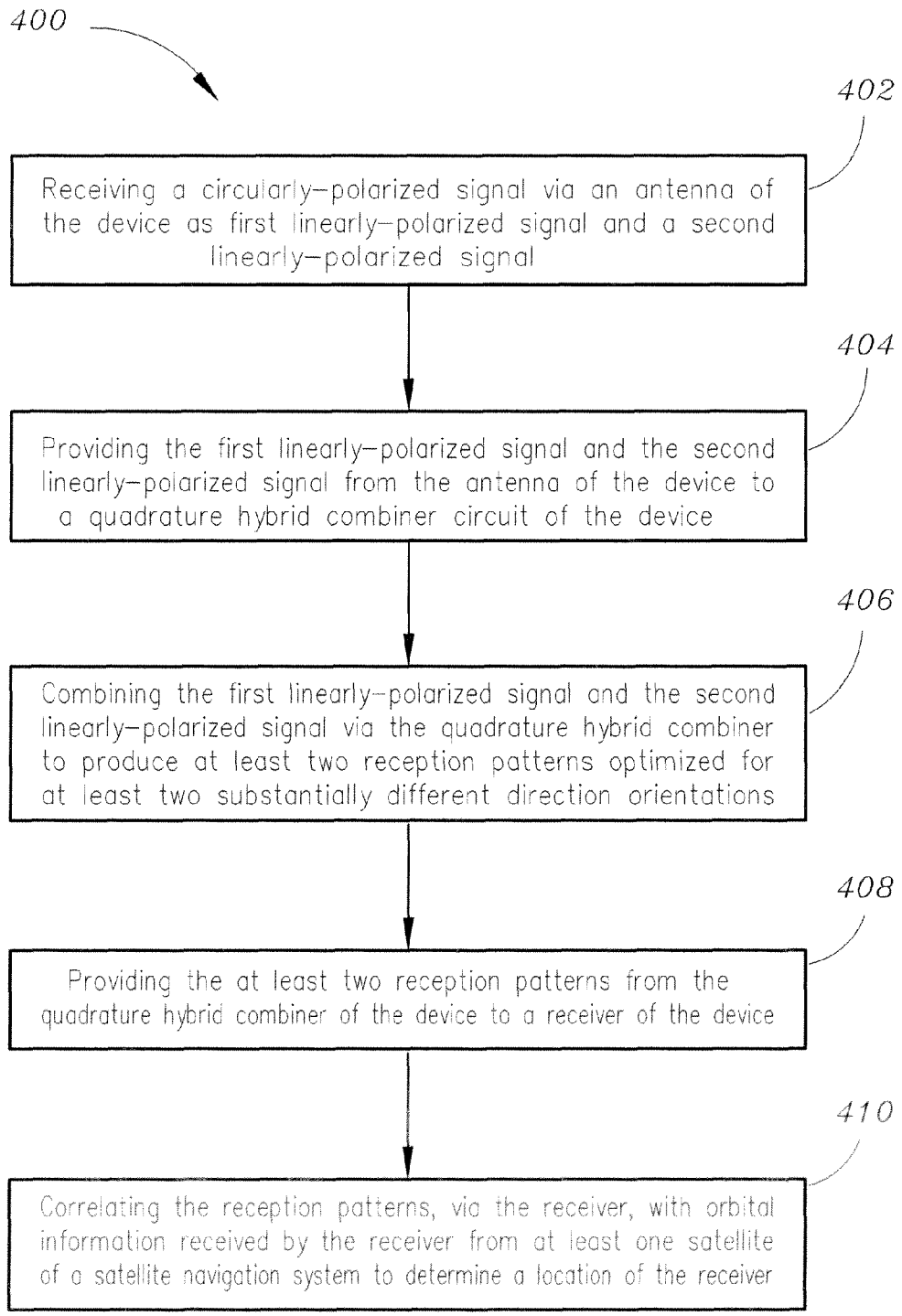
FIG. 4 is a flowchart illustrating a method for signal handling via the device embodiment shown in FIG. 2A in accordance with an alternative exemplary embodiment of the present invention.

FIG. 4 is a flowchart illustrating a method for signal handling via the device embodiment shown in FIG. 2B in accordance with an exemplary embodiment of the present invention. The method 400 may include the step of receiving a circularly-polarized signal via an antenna of the device as a first linearly-polarized signal and a second linearly-polarized signal 402. The method 400 may further include providing the first linearly-polarized signal and the second linearly-polarized signal from the antenna of the device to a quadrature hybrid combiner circuit of the device 404. The method 400 may further include combining the first linearly-polarized signal and the second linearly-polarized signal via the quadrature hybrid combiner to produce at least two reception patterns 406. For example, the reception patterns may be created by summing the first linearly-polarized signal and the second linearly-polarized signal via utilization of phase shifting, such that the reception patterns are optimized for at least two substantially different directional orientations. The method 400 may further include providing the at least two reception patterns from the quadrature hybrid combiner of the device to a receiver of the device 408. The method 400 may further include correlating the reception patterns, via the receiver, with orbital information received by the receiver from at least one satellite of a satellite navigation system to determine a location of the receiver 410.

Figure 5:
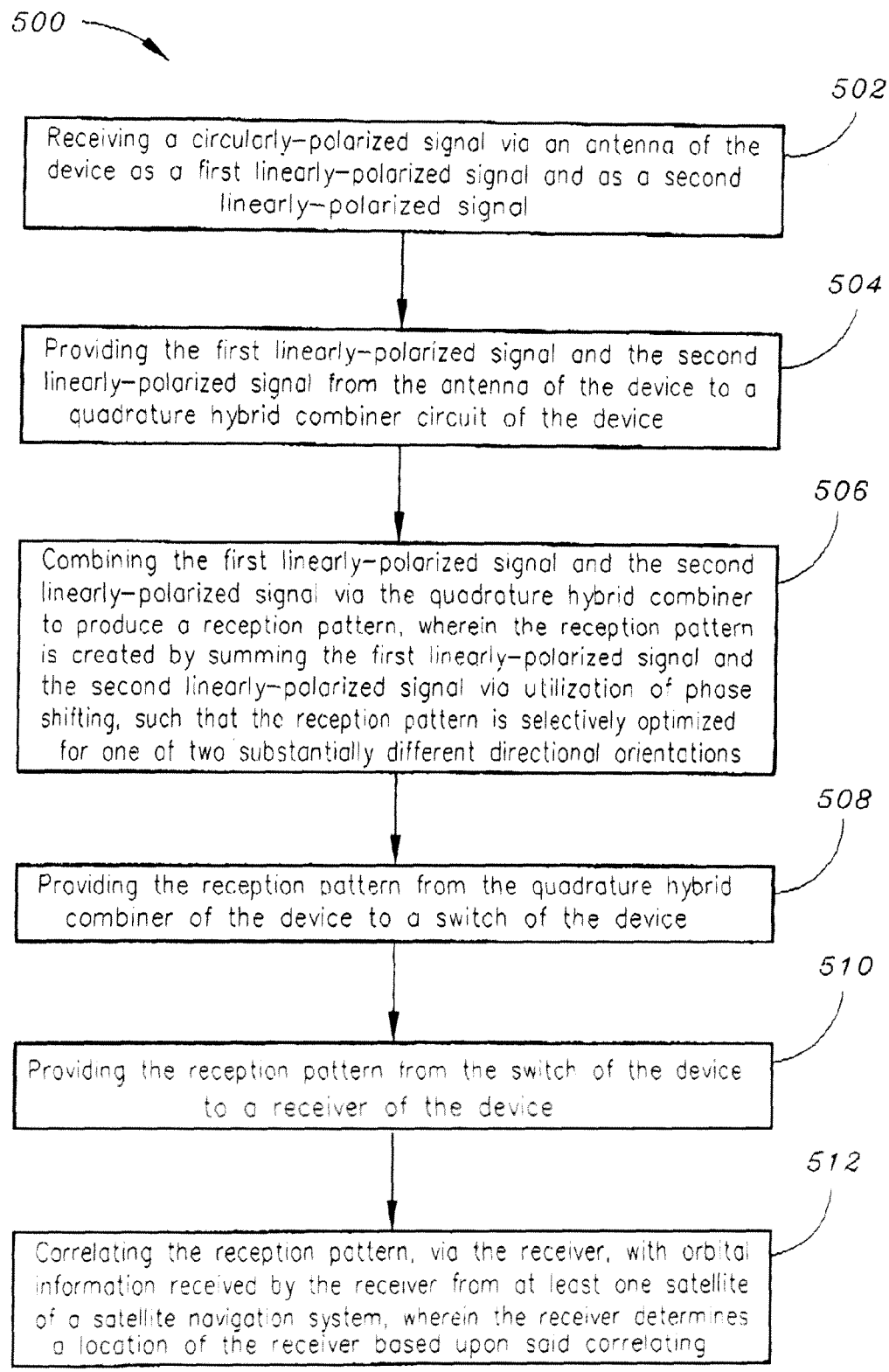
FIG. 5 is a flowchart illustrating a method for signal handling via the device embodiment shown in FIG. 2B in accordance with a further alternative exemplary embodiment of the present invention.

FIG. 5 is a flowchart illustrating a method for signal handling via the device embodiment shown in FIG. 2A in accordance with an exemplary embodiment of the present invention. The method 500 may include the step of receiving a circularly-polarized signal via an antenna of the device as a first linearly-polarized signal and a second linearly-polarized signal 502. The method 500 may further include providing the first linearly-polarized signal and the second linearly-polarized signal from the antenna of the device to a quadrature hybrid combiner circuit of the device 504. The method 500 may further include combining the first linearly-polarized signal and the second linearly-polarized signal via the quadrature hybrid combiner to produce a reception pattern, wherein the reception pattern is created by summing the first linearly-polarized signal and the second linearly-polarized signal via utilization of phase shifting, such that the reception pattern is selectively optimized for one of two substantially different directional orientations 506. The method 500 may further include providing the reception pattern from the quadrature hybrid combiner of the device to a switch of the device 508. The method 500 may further include providing the reception pattern from the switch of the device to a receiver of the device 510. The method 500 may further include correlating the reception pattern, via the receiver, with orbital information received by the receiver from at least one satellite of a satellite navigation system, wherein the receiver determines a location of the receiver based upon said correlating 512.

Figure 6:
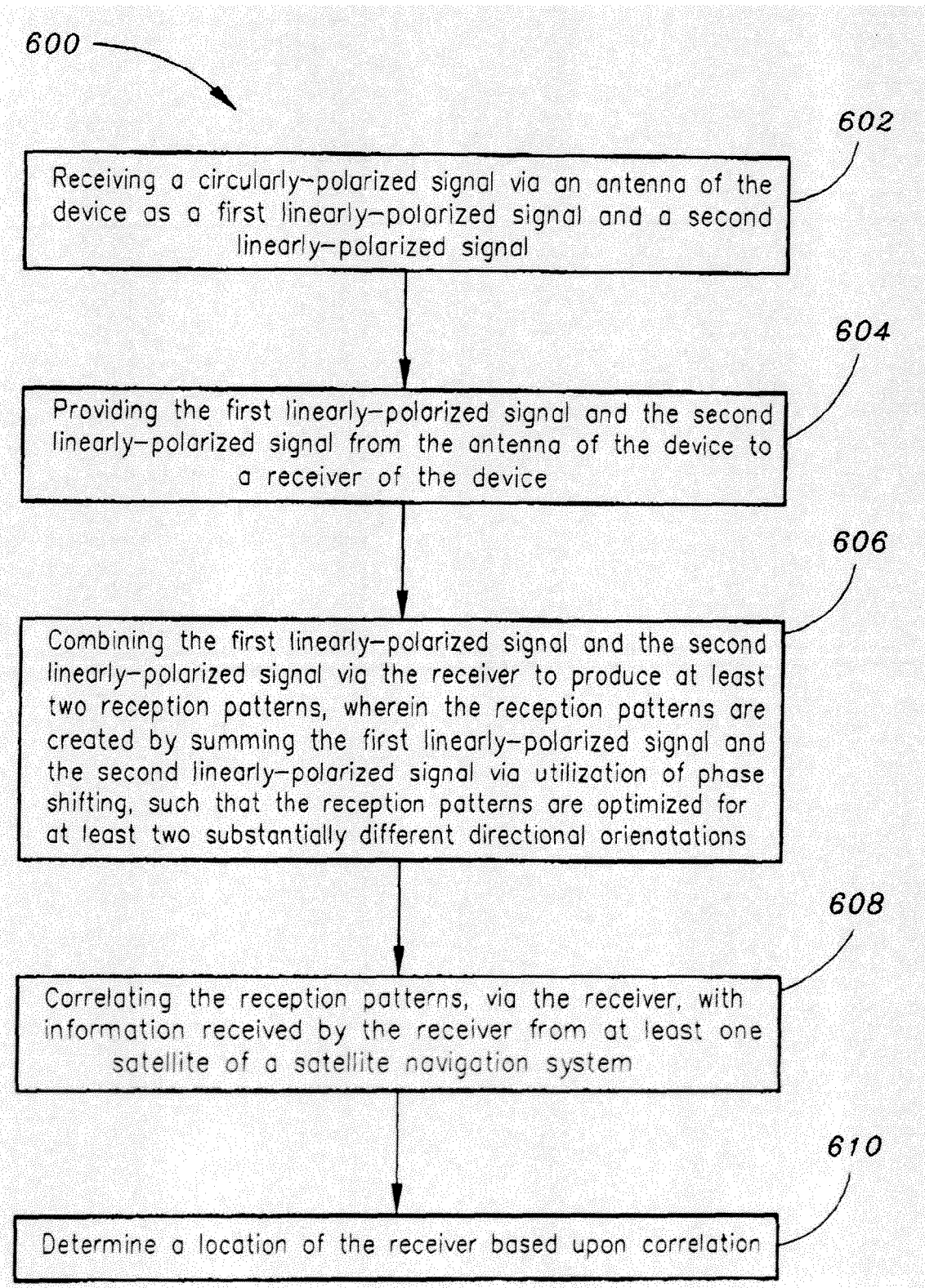
FIG. 6 is a flowchart illustrating a method for signal handling via the device embodiment shown in FIG. 2C in accordance with a still further alternative exemplary embodiment of the present invention.

FIG. 6 is a flowchart illustrating a method for signal handling via the device embodiment shown in FIG. 2C in accordance with an exemplary embodiment of the present invention. The method 600 may include the step of receiving a circularly-polarized signal via an antenna of the device as a first linearly-polarized signal and a second linearly-polarized signal 602. The method 600 may further include providing the first linearly-polarized signal and the second linearly-polarized signal from the antenna of the device to a receiver of the device 604. The method 600 may further include combining the first linearly-polarized signal and the second linearly-polarized signal via the receiver to produce at least two reception patterns, wherein the reception patterns are created by summing the first linearly-polarized signal and the second linearly-polarized signal via utilization of phase shifting, such that the reception patterns are optimized for at least two substantially different directional orientations 606. The method 600 may further include correlating the reception patterns, via the receiver, with information received by the receiver from at least one satellite of a satellite navigation system 608. The method 600 may further include determining a location of the receiver based upon said correlating 610.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A device, comprising:
an antenna, the antenna being configured for receiving a circularly-polarized signal as a first linearly-polarized signal and a second linearly-polarized signal, the antenna being a dielectric resonator antenna, the dielectric resonator antenna including a first portion having a first dielectric constant and a second portion having a second dielectric constant, the first dielectric constant being suitable for resonating a Global Positioning System feed of the dielectric resonator antenna, the second dielectric constant being suitable for allowing at least five percent of bandwidth from a Height of Burst feed of the dielectric resonator antenna;
circuitry, the circuitry being connected to the antenna, the circuitry being configured for combining the first linearly-polarized signal and the second linearly-polarized signal to produce at least two reception patterns,
wherein the reception patterns are created by summing the first linearly-polarized signal and the second linearly-polarized signal via utilization of phase shifting, such that the reception patterns are optimized for at least two substantially different directional orientations.

2. A device as claimed in claim 1, wherein the circuitry includes a receiver.

3. A device as claimed in claim 2, wherein the circuitry includes a quadrature hybrid combiner circuit, the quadrature hybrid circuit being connected to the receiver.

4. A device as claimed in claim 3, wherein the circuitry further includes a switch, the switch being connected between the quadrature hybrid combiner circuit and the receiver.

5. A device as claimed in claim 1, wherein the device is implemented on a guided munition platform.

6. A device as claimed in claim 5, wherein the first portion is a conical section of ceramic having an aperture formed therein.

7. A device as claimed in claim 6, wherein a first section of the second portion forms an ogive tip for the guided munition platform and a second section of the second portion forms a tube, said tube extending at least partially through the aperture of the first portion and at least partially over the Height of Burst feed, thereby forming a protective enclosure around the Height of Burst feed.

8. A method for signal handling via a device, comprising:
receiving a circularly-polarized signal via an antenna of the device as a first linearly-polarized signal and a second linearly-polarized signal, the antenna being a dielectric resonator antenna, the dielectric resonator antenna including a first portion having a first dielectric constant and a second portion having a second dielectric constant, the first dielectric constant being suitable for resonating a Global Positioning System feed of the dielectric resonator antenna, the second dielectric constant being suitable for allowing at least five percent of bandwidth from a Height of Burst feed of the dielectric resonator antenna;
providing the first linearly-polarized signal and the second linearly-polarized signal from the antenna of the device to a quadrature hybrid combiner circuit of the device; and
combining the first linearly-polarized signal and the second linearly-polarized signal via the quadrature hybrid combiner to produce at least two reception patterns,
wherein the reception patterns are created by summing the first linearly-polarized signal and the second linearly-polarized signal via utilization of phase shifting, such that the reception patterns are optimized for at least two substantially different directional orientations.

9. A method as claimed in claim 8, further comprising:
providing the at least two reception patterns from the quadrature hybrid combiner of the device to a receiver of the device.

10. A method as claimed in claim 9, further comprising:
correlating the reception patterns, via the receiver, with orbital information received by the receiver from at least one satellite of a satellite navigation system.

11. A method as claimed in claim 10, further comprising:
wherein the receiver determines a location of the receiver based upon said correlating.

12. A method for signal handling via a device, comprising:
receiving a circularly-polarized signal via an antenna of the device as a first linearly-polarized signal and a second linearly-polarized signal, the antenna being a dielectric resonator antenna, the dielectric resonator antenna including a first portion having a first dielectric constant and a second portion having a second dielectric constant, the first dielectric constant being suitable for resonating a Global Positioning System feed of the dielectric resonator antenna, the second dielectric constant being suitable for allowing at least five percent of bandwidth from a Height of Burst feed of the dielectric resonator antenna;
providing the first linearly-polarized signal and the second linearly-polarized signal from the antenna of the device to a quadrature hybrid combiner circuit of the device; and
combining the first linearly-polarized signal and the second linearly-polarized signal via the quadrature hybrid combiner to produce a reception pattern,
wherein the reception pattern is created by summing the first linearly-polarized signal and the second linearly-polarized signal via utilization of phase shifting, such that the reception pattern is selectively optimized for one of two substantially different directional orientations.

13. A method as claimed in claim 12, further comprising:
providing the reception pattern from the quadrature hybrid combiner of the device to a switch of the device.

14. A method as claimed in claim 13, further comprising:
providing the reception pattern from the switch of the device to a receiver of the device.

15. A method as claimed in claim 14, further comprising:
correlating the reception pattern, via the receiver, with orbital information received by the receiver from at least one satellite of a satellite navigation system, wherein the receiver determines a location of the receiver based upon said correlating.

16. A method for signal handling via a device, comprising:
receiving a circularly-polarized signal via an antenna of the device as a first linearly-polarized signal and a second linearly-polarized signal, the antenna being a dielectric resonator antenna, the dielectric resonator antenna including a first portion having a first dielectric constant and a second portion having a second dielectric constant, the first dielectric constant being suitable for resonating a Global Positioning System feed of the dielectric resonator antenna, the second dielectric constant being suitable for allowing at least five percent of bandwidth from a Height of Burst feed of the dielectric resonator antenna;

providing the first linearly-polarized signal and the second linearly-polarized signal from the antenna of the device to a receiver of the device; and
combining the first linearly-polarized signal and the second linearly-polarized signal via the receiver to produce at least two reception patterns,
wherein the reception patterns are created by summing the first linearly-polarized signal and the second linearly-polarized signal via utilization of phase shifting, such that the reception patterns are optimized for at least two substantially different directional orientations.

17. A method as claimed in claim 16, further comprising:
correlating the reception patterns, via the receiver, with information received by the receiver from at least one satellite of a satellite navigation system.

18. A method as claimed in claim 17, further comprising:
determining a location of the receiver based upon said correlating.

* * * * *